United States Patent [19]
Hutchinson

[11] Patent Number: 4,998,862
[45] Date of Patent: Mar. 12, 1991

[54] AIR COMPRESSOR PRESSURE REGULATING VALVE SYSTEM

[75] Inventor: William R. Hutchinson, Clemmons, N.C.

[73] Assignee: Ingersoll-Rand Company, Woodcliff Lake, N.J.

[21] Appl. No.: 416,278

[22] Filed: Oct. 2, 1989

[51] Int. Cl.$^5$ .............................................. F04B 49/08
[52] U.S. Cl. ................................. 417/28; 137/116.5; 137/492.5
[58] Field of Search .......................... 417/28, 26, 295; 137/486, 492, 116.5, 492.5

[56] References Cited

U.S. PATENT DOCUMENTS

| | | | |
|---|---|---|---|
| 930,843 | 8/1909 | Cook | 417/295 |
| 941,153 | 4/1909 | Krichbaum . | |
| 2,707,966 | 5/1950 | Taplin . | |
| 2,806,481 | 4/1953 | Faust . | |
| 2,961,147 | 11/1960 | Osterkamp | 417/28 |
| 3,072,319 | 1/1963 | Cox et al. | 417/28 X |
| 3,204,657 | 9/1963 | Boyd . | |
| 3,226,011 | 12/1965 | Gustafson | 417/295 X |
| 3,282,285 | 7/1963 | Hanson et al. . | |
| 4,313,460 | 2/1982 | Johnson | 137/492 X |
| 4,515,515 | 5/1985 | Segonne | 417/295 X |

*Primary Examiner*—Stephen M. Hepperle
*Attorney, Agent, or Firm*—Glenn B. Foster

[57] ABSTRACT

An air compressor pressure regulating system which controls the operation of an air compressor. A variable speed driver, which is controlled by a throttle, controls the speed of the driver. A compressor valve integrally regulates the airflow to the compressor inlet. The pressure regulating valve is connected between the compressor outlet and a closed reservoir. The pressure existing in the closed reservoir directly effects both the operation of the compressor throttle and the compressor valve. The pressure regulating valve includes of two movable diaphragms (or pistons), which are spaced parallel to each other and which are connected to each other by a rigid connecting member producing similar motion in both diaphragms. The compressor outlet pressure is exposed to the first side of the first diaphragm. The reservoir pressure is exerted on the second side of the first diaphragm as well as the first side of the second diaphragm. An adjustable spring force and the vented atmosphere act on the second side of the second diaphragm. When the compressor outlet reaches a sufficient pressure, dependent on the reservoir pressure, both diaphragms will be jointly raised toward their respective second sides, and compressed air will be permitted to freely flow from the compressor outlet area to the closed reservoir.

15 Claims, 3 Drawing Sheets

AIR COMPRESSOR PRESSURE REGULATING VALVE SYSTEM

BACKGROUND OF THE INVENTION

This invention relates generally to pressurized fluid handling valves, and more particularly to valves provided to control both the throttling mechanism and inlet valve position for an air compressor depending upon the compressor outlet pressure.

As shown in FIG. 1 of this invention, compressors 12 are now used to power jackhammers, riveters or other items 13 which often only are intermittently used by the operator. The compressor 12 includes a driven fan portion 16, a motor 14, an inlet 15 and an outlet 24. The inflow of air to the driven fan portion 16 is controlled by the position of piston 19 within compressor valve 18 (the piston is shown displaced at 19'). A spring 29 is included to bias the piston 19 in valve 18 to the left as illustrated in FIGS. 1 and 2, thereby placing the compressor 12 in a loaded state. The speed of the motor 14 is directly controlled by a throttle 20.

When the pressure in conduit 26 of compressor outlet 24 reaches a certain limit, a diaphragm 30 (within regulator valve 10) compresses a spring 32 and permits pressure to flow from conduit 26 to control tube 28. The pressure in control tube 28, as regulated by the valve 10 and a release outlet 22, controls the operation of valve 18 and throttle 20. The outlet 22 of many systems is connected between the compressor valve 18 and the compressor 12, as shown at 22', to reduce the vacuum at compressor inlet 15.

When the compressor 12 is in an unloaded condition due to the workpiece 13 consuming little or no air, the pressure in compressor outlet 24 will rise causing the regulator valve 10 to open. The pressure in the control tube 28 will then increase which will concurrently close the valve 18 and idle the throttle 20, limiting the air pumped by the compressor 12.

If the compressor outlet pressure drops due to the operation of the workpiece 13, the valve 10 will close. The pressure in the control tube 28 will quickly bleed out of the opening 22, thus causing the compressor valve 18 to open and increase the position of the throttle 20 increasing the speed of compressor 16.

In the above system, as much as 900 cubic feet per hour will pass through opening 22 when the compressor 16 is unloaded and the valve 10 is in a fully open position. This continual air passage presents several limitations.

The first limitation is that any pressure which passes through the release opening must be supplied by the compressor. Therefore, excessive compressor operation and wear occurs. Relatedly, icing often occurs when excessive compressed air containing moisture rapidly travels through the regulator valve 10 and opening 22.

The first solution to the icing problem is to insert heating elements to the areas prone to icing. These heating elements however are expensive and icing often occurs at other unexpected locations. The second icing solution involves chemically treating the air which is about to enter valve 10 with a deicing agent. Besides requiring expensive equipment to insert the agent, it is also necessary for someone to monitor the level of the agent in the reservoir. The deicing agents often are abrasive on whatever components they encounter. The final solution to this problem is to provide water moisture removal equipment upstream of the pressure valve 10. This equipment is expensive and bulky.

Another limitation with the above compressor control system involves the loud noise produced by air escaping from the release opening. Dirt and impurities in the air block or change the shape of the opening, eventually affecting the downstream pressure of the compressor as well as interrelated throttling operation of the compressor.

To deaden the excessive opening noise, a muffler is often inserted over the opening 22. Besides making the device more complex and expensive, the muffler often becomes clogged or breaks.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus comprising a compressor having a compressor inlet and a compressor outlet. A valve is included for controlling fluid flow to the compressor inlet, the valve being displaceable between an unloaded position and a loaded position for placing the compressor in an unloaded state and a loaded state respectively. A pressure regulating valve has a pressure regulating valve inlet and an pressure regulating valve outlet, the pressure regulating valve inlet being in communication with the compressor outlet. A reservoir communicates the pressure regulating valve outlet with said valve means whereby pressure in the reservoir affects operation of the valve, whereby fluid communication between the reservoir and atmosphere is blocked when the valve means is in the unloaded position and fluid pressure in the reservoir exceeds the pressure in the pressure regulating valve inlet by a predetermined ratio for each pressure.

The foregoing and other aspects will become apparent from the following detailed description of the invention when considered in conjunction with the accompanying drawing figures. It is to be expressly understood, however, that the drawing figures are not intended as a definition of the invention but are for the purpose of illustration only.

DETAILED DESCRIPTION

Figure 1:
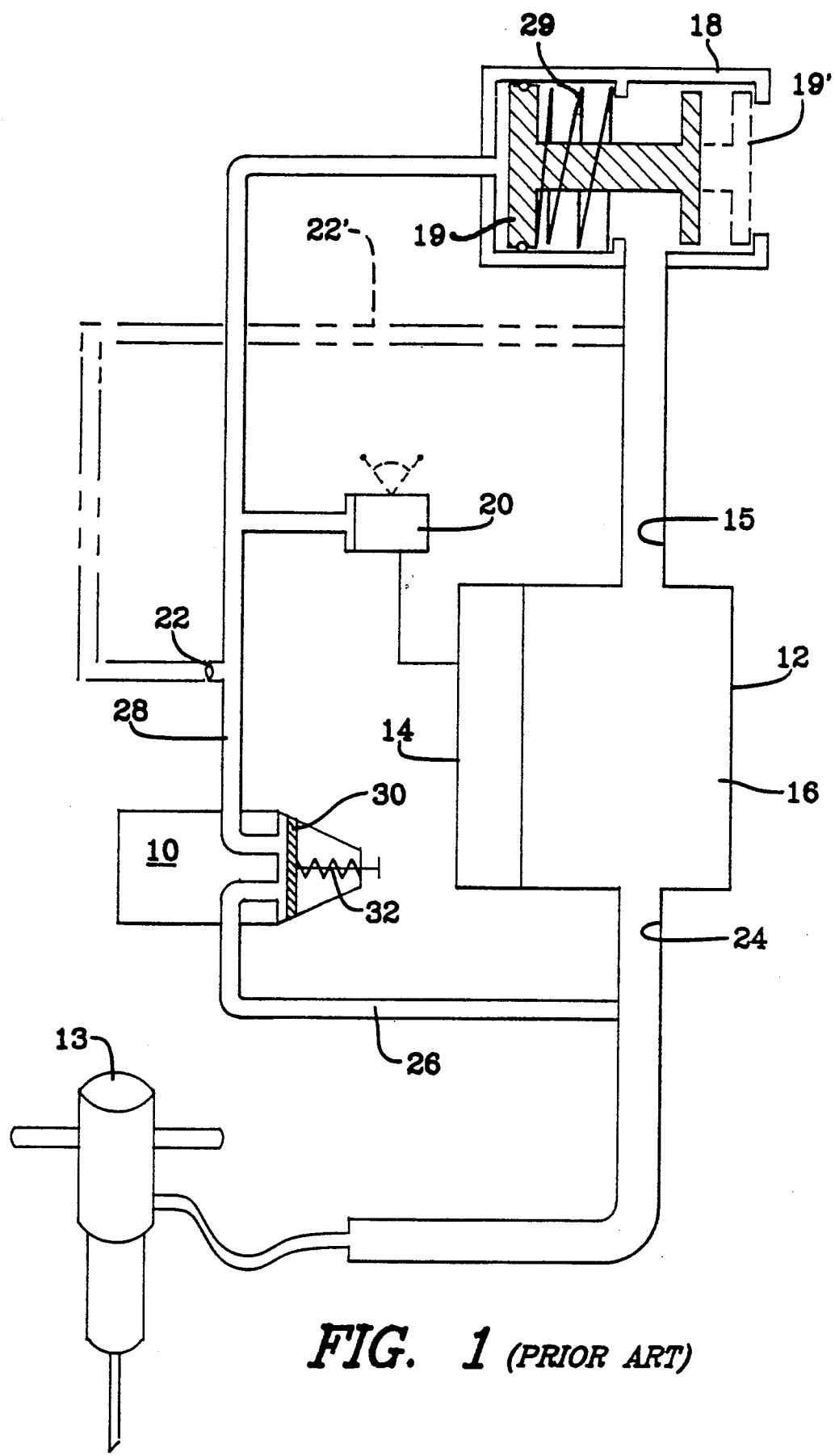
FIG. 1 is a schematic view illustrating a prior art compressor pressure regulator system.

Identical elements in different embodiments are referenced by identical reference characters in this specification.

Figure 2:
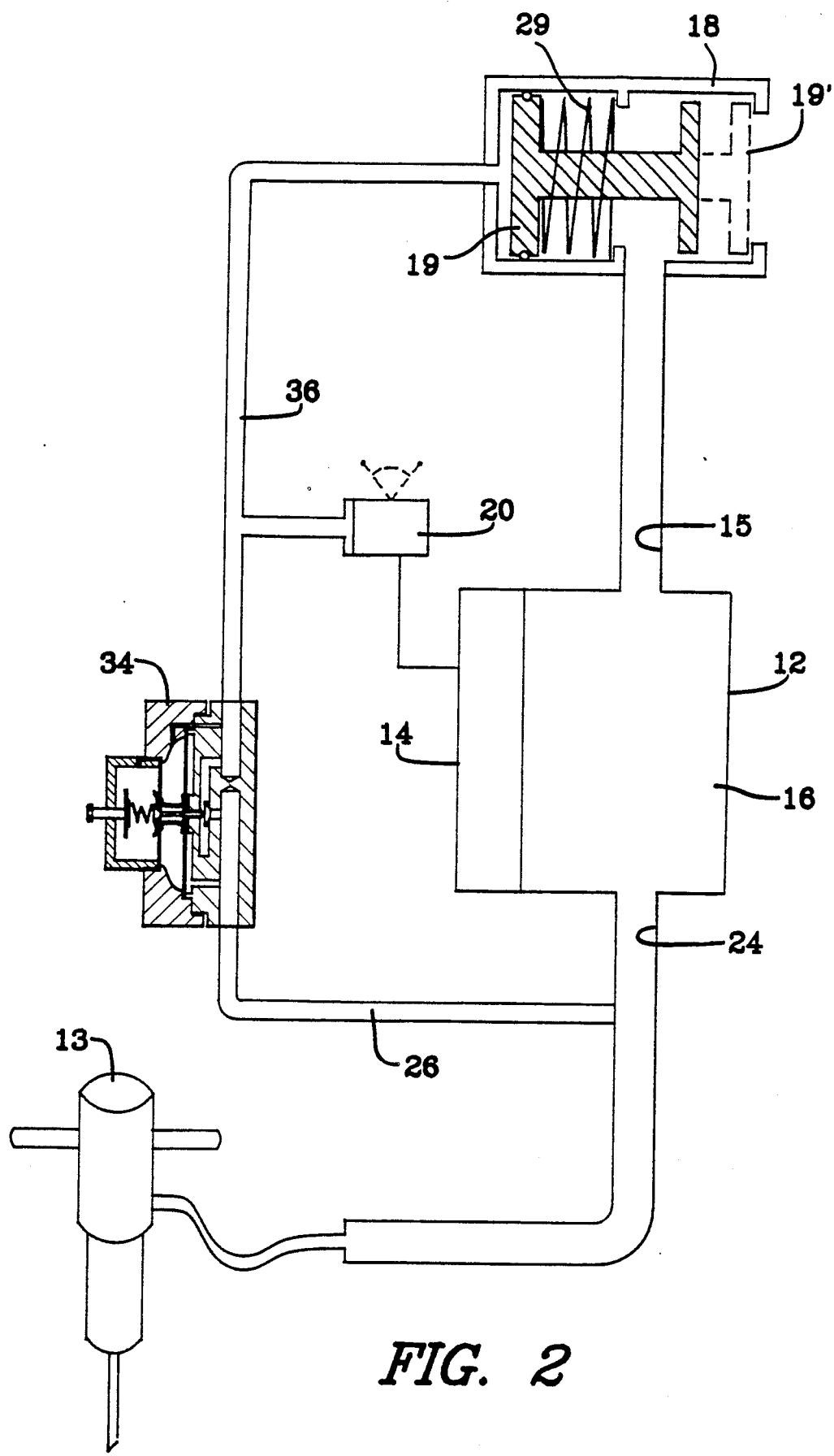
FIG. 2 is a schematic view illustrating an embodiment of the compressor pressure regulator system of the instant invention.
Figure 3:
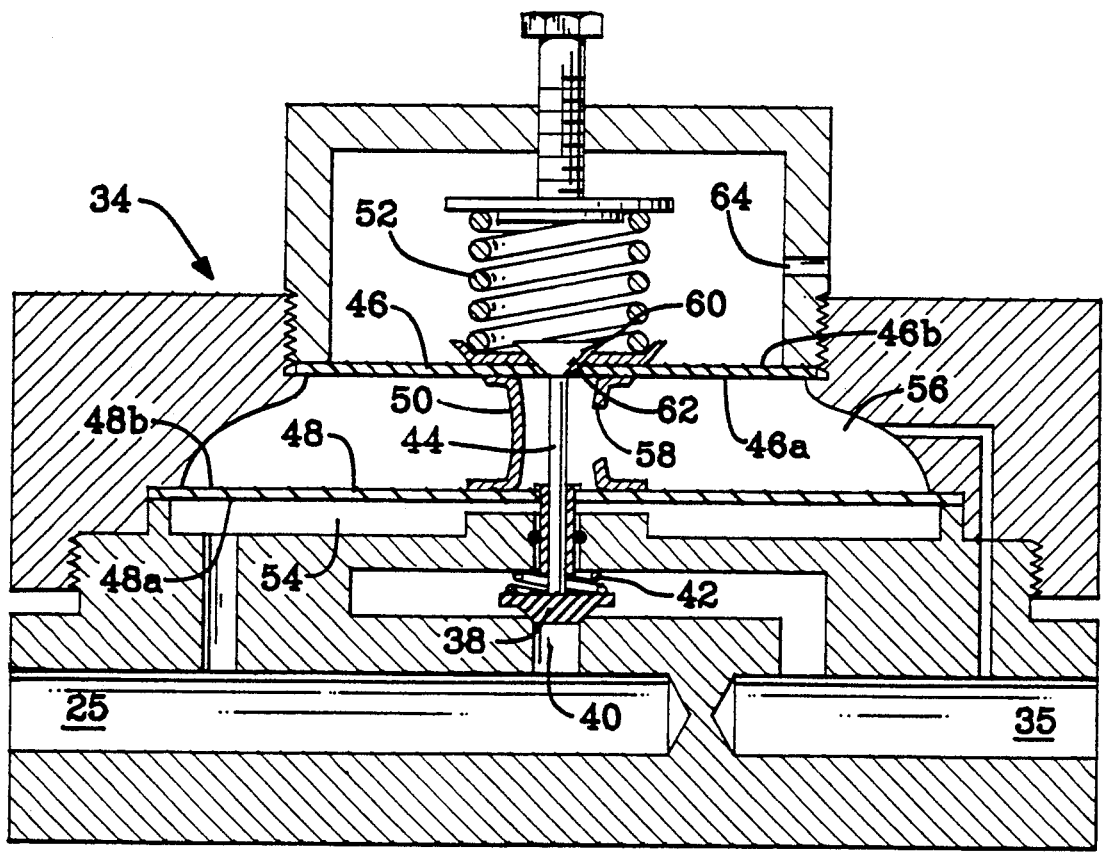
FIG. 3 is a detailed cross sectional view illustrating an embodiment of the pressure regulating valve of the instant invention.
Figure 4:
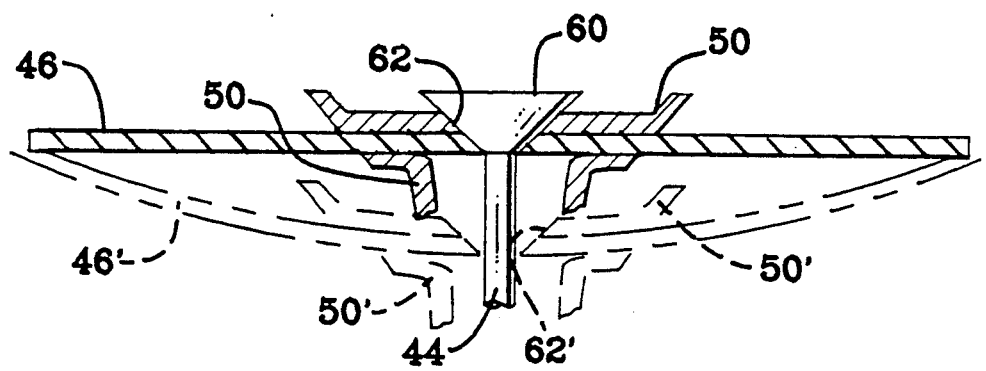
FIG. 4 shows an enlargement view illustrating an embodiment of the diaphragm of FIG. 3, and how downward deflection results in a pressure release.

Referring now the drawings, FIGS. 2, 3 and 4 illustrate an embodiment of the air compressor pressure, regulating valve system of the instant invention. Similar elements to those existing in FIG. 1, as described in the background of the instant invention, are similarly numbered.

A regulator valve 34 controls the flow of pressurized air from the conduit 26 into a closed control reservoir 36, as seen in FIGS. 2, 3 and 4. The reservoir 36 differs from the control tube 28 of the prior art as shown in FIG. 1 in that there is no venting in the reservoir 36 to the atmosphere. Therefore, all of the icing, noise, and muffler problems associated with the prior art when a large amount of air travels through the opening 22, are eliminated in the present embodiment. A seal 38, which is biased by the action of a spring 42 and a plunger 44, contact a throat 40 to limit air flowing from inlet conduit 26 via an inlet port 25 to the reservoir 36 via an outlet port 35. To remove the releasable seal 38 from an orifice 40, the following elements and forces come into play.

Diagraphms 46 and 48 are interspaced by a rigid connector 50 such than any displacement in either of the diaphragms will be mirrored by the other diaphragm. It is anticipated that a piston may be used in place of the diaphragm, and will function similarly. Diaphragm 46 includes a first side 46a and a second side 46b and, similarly, the diaphragm 48 has a first side 48a and a second side 48b. An adjustable spring 52 exerts an adjustable downward force on the connector 50, as does the spring 42. Upward motion of the diaphragms 46 and 48 result in upward motion of plunger 44, which releases the seal 38 from the throat 40.

When the pressure in the inlet port 25 builds to a considerably higher pressure than that of the outlet port 35, the following occurs. Since the pressure existing in inlet port 25 is also exerted within a space 54, the upward force acting on diaphragm 48 in a space 54 equals the pressure times the area, or $F_{54} = P_{54} \times A_{48}$. The downward force exerted by spring 52, regardless of the position of diaphragms 46, 48, will be considered as a constant force S, (which is nearly accurate since the distance which the spring 52 actually deflects is extremely small considering the length of the spring).

The spring force of the spring 52 can be adjusted so that the seal 38 will release at the desired compressor outlet pressure ($P_R$). In the following equations, as a convention, any upward force as viewed in FIG. 3 will be considered as positive, and any downward force will be negative. Summing the forces in the valve at the point of the valve releasing yields the following equation:

$$-S + P_R A_{48} = 0$$

or $$S = P_R A_{48}$$

Also, the pressure in space 54 will be considered $P_1$ while the pressure in a space 56, which is the pressure existing at the outlet port 35 will be $P_2$. The horizontal cross sectional area of diaphragm 48 will be $A_1$ while that area of diaphragm 46 will be considered $A_2$. The prior equation therefor becomes:

$$S = P_R A_1$$

Since the reservoir 36 is not open to the atmosphere, any air pressure which builds up in the reservoir 36 from compressor outlet 35 will remain (providing the diaphragms 46 and 48 are not downwardly displaced as will be later described).

As stated above, any pressure in reservoir is also applied to the space 56, and in this application is called $P_2$, which will exert a downward force of $(-)P_2 A_1$ as well as an upward force of $(+) P_2 A_2$. Summing the total forces within the regulating valve 34, once pressure exists in $P_2$, results in this equation:

$$F_{valve} = -S - P_2 A_1 + P_1 A_1 + P_2 A_2$$

or since $S = P_R A_1$, as above determined:

$$F_{valve} = -P_R A_1 - P_2 A_1 + P_1 A_1 + P_2 A_2$$

At equilibrium (where $F_{valve} = 0$), the equation becomes:

$$0 = -P_R A_1 - P_2 A_1, + P_1 A_1, + P_2 A_2 \text{ or}$$

$$0 = -P_2(A_2 - A_1) + A_1(P_1 - P_R)$$

$$P_2(A_{2R} A_2) = A_1(P_1 - P_R)$$

Finally:

$$P_2 = \frac{A_1 (P_1 - P_R)}{(A_1 - A_2)}$$

The critical consideration of this equation is that valves can now be provided to consider the compressor outlet pressure $P_1$, the reservoir pressure $P_2$ and the desired release pressure $P_R$ simply by altering the areas of diaphragms 46 and 48. This valve can be much more precise than the valve 10 previously shown in FIG. 1.

Often when the pressure in the compressor discharge at outlet 24 and in conduit 26, drops more than a desired amount below the pressure in reservoir 36, it is desired to release some of the pressure in reservoir 36, to reflect the pressure decrease, and thereupon increase the operation of compressor 16. Since under these conditions the forces acting on the valve are negative, the diaphragms are forced downwardly. The plunger is restrained against downward motion when the seal 38 contacts the throat 40. Therefore, upon excessive downward diaphragm motion, a gasket 60 will be displaced from sealing engagement with a gasket mount 62. The excessive reservoir pressure will be released from the space 56 through an aperture 58 in diaphragm support 50, the gasket mount 62 (shown in its deflected position), and via an exit 64 to the atmosphere. This pressure release from reservoir 36 serves substantially the same function as the opening 22 in the control tube 28 as shown in FIG. 1, without the associated control tube problems previously described in the background.

Namely, in the instant invention, there is no air rushing through opening 22. The great noise caused by exiting air is thus eliminated. Also, since no muffler is required, the associated muffler problems are eliminated. Finally, the icing problems and equipment are eliminated since the rapid rush of air is greatly reduced.

It is worth noting that the difference between $P_1$ and $P_2$ required to cause upward diaphragm deflection is not constant. When $P_1$ changes, $P_2$ must change to restore the forces to zero. The diaphragms are deflected up when $P_1$ rises. This causes $P_2$ to rise until the forces become equal and the diaphragms return to their normal position. When $P_1$ decreases, a force imbalance causes the diaphragms to deflect down. This vents pressure $P_2$ until the forces are once again equal and the diaphragms return to their normal position. The difference $P_1$ and $P_2$ changes as the valve operates. A similar change in pressure differentials between $P_2$ and $P_1$ is required to release the gasket 62 from its mountings in the connector 50 when the ratio between $P_2$ and $P_1$ exceeds a certain limit.

While this invention has been illustrated and described in accordance with a preferred embodiment, it is recognized that other variations and changes may be made therein without departing from the invention as set forth in the claims.

What is claimed is:

1. An apparatus comprising:
 a compressor having a compressor inlet and a compressor outlet;
 throttle means for regulating the speed of the compressor;
 valve means for limiting fluid flow to the compressor inlet;
 a pressure regulating valve having an inlet and an outlet, said pressure regulating valve inlet being in communication with the compressor outlet; and
 a reservoir communicating the pressure regulating valve outlet and said valve means whereby pressure in the reservoir directly controls operation of the throttle means and the valve means, the pressure regulating valve including a first and a second diaphragm, each diaphragm having a first side and a second side, whereby pressure at the compressor outlet is exerted on the first side of the first diaphragm and the pressure in the reservoir is exerted on both the second side of the first diaphragm and the first side of said second diaphragm.

2. An apparatus comprising:
 a compressor having a compressor inlet and a compressor outlet;
 valve means for controlling fluid flow to the compressor inlet, the valve means being displaceable between an unloaded position and a loaded position for placing the compressor in an unloaded state and a loaded state respectively;
 a pressure regulating valve having a pressure regulating valve inlet and a pressure regulating valve outlet, said pressure regulating valve inlet being in communication with the compressor outlet; and
 reservoir means for communicating the pressure regulating valve outlet with said valve means whereby pressure in the reservoir means controls operation of the valve means, whereby fluid communication between the reservoir means and atmosphere is blocked when the valve means is in the unloaded position and fluid pressure in the reservoir means exceeds the pressure in the pressure regulating valve inlet by a predetermined ratio for each pressure.

3. The apparatus as described in claim 2, further comprising:
 (a) connector means for interconnecting said first and the second diaphragms such that any motion in either of the first or second diaphragm will result in a similar motion in the other of the first or second diaphragm.

4. The apparatus as described in claim 3, wherein a substantially constant force is exerted on the connector.

5. The apparatus as described in claim 4, wherein the connector is displaced in a first direction whenever the ratio of the compressor outlet pressure divided by the reservoir pressure exceeds a predetermined limit for each compressor outlet pressure.

6. The apparatus as described in claim 3, further comprising:
 (a) seal means for restricting flow between the compressor outlet and the reservoir, the seal means releasing the flow restriction when the connector is displaced.

7. The apparatus as described in claim 3, further comprising:
 (a) gasket means for sealing communication between the reservoir and the atmosphere, the gasket means being released upon displacement of the connector.

8. The apparatus as described in claim 7, wherein the connector is displaced when the ratio between the reservoir pressure divided by the compressor outlet pressure exceeds a predetermined limit for each reservoir pressure.

9. The apparatus as described in claim 2 wherein the pressure regulating valve further comprises:
 a first and a second diaphragm, each diaphragm having a first and second side, wherein pressure at the pressure outlet is in communication with the first side of the first diaphragm and the pressure in the reservoir means is in communication with both the second side of the first diaphragm and the first side of the second diaphragm.

10. The apparatus of described in claim 9, further comprising:
 connector means for interconnecting said first and second diaphragms such than any motion imparted on either the first or second diaphragm will result in smaller motion on the other of said first or second diaphragms.

11. The apparatus as described in claim 10, further comprising:
 restricting means for restricting flow between the compressor outlet and the reservoir means, the restricting means being broken by displacement of the connector.

12. The apparatus as described in claim 11, wherein the restricting means includes a seal.

13. The apparatus as described in claim 10, further comprising:
 sealing means for sealing pressure of the reservoir means from communication with the atmosphere, the sealing means being released when the connector is displaced.

14. The apparatus as described in claim 13, wherein the sealing means includes a gasket.

15. The apparatus as described in claim 2, wherein the apparatus further comprises:
 throttle means for regulating speed of the compressor means and being controlled by pressure in the reservoir means.

* * * * *